(12) United States Patent
Seong et al.

(10) Patent No.: US 10,351,008 B2
(45) Date of Patent: Jul. 16, 2019

(54) COIL ALIGNMENT METHOD IN WIRELESS POWER TRANSFER SYSTEM AND APPARATUS USING THE SAME

(71) Applicants: Hyundai Motor Company, Seoul (KR); Kia Motors Corporation, Seoul (KR); Konkuk University Industrial Cooperation Corp., Seoul (KR)

(72) Inventors: Jae Yong Seong, Gyeonggi-Do (KR); Kong Pengfei, Seoul (KR); Won Shil Kang, Seoul (KR); Hyun Chul Ku, Seoul (KR); Jong Gyun Lim, Seoul (KR)

(73) Assignees: Hyundai Motor Company, Seoul (KR); Kia Motors Corporation, Seoul (KR); Konkuk University Industrial Cooperation Corp., Seoul (KR)

( * ) Notice: Subject to any disclaimer, the term of this patent is extended or adjusted under 35 U.S.C. 154(b) by 26 days.

(21) Appl. No.: 15/612,042

(22) Filed: Jun. 2, 2017

(65) Prior Publication Data
US 2017/0361724 A1   Dec. 21, 2017

(30) Foreign Application Priority Data
Jun. 16, 2016   (KR) .................... 10-2016-0075272

(51) Int. Cl.
*H02J 7/00* (2006.01)
*B60L 11/18* (2006.01)
*H02J 50/90* (2016.01)
*H02J 7/02* (2016.01)
*H02J 50/10* (2016.01)
*B60L 53/38* (2019.01)
*B60L 53/37* (2019.01)

(52) U.S. Cl.
CPC ........... *B60L 11/1829* (2013.01); *B60L 53/37* (2019.02); *B60L 53/38* (2019.02); *H02J 7/025* (2013.01); *H02J 50/10* (2016.02); *H02J 50/90* (2016.02)

(58) Field of Classification Search
CPC ........ H02J 7/025; H01F 38/14; Y02T 90/122; B60L 11/182; Y02E 60/12
USPC ........................................................ 320/108
See application file for complete search history.

(56) References Cited

U.S. PATENT DOCUMENTS 5,850,135 A * 12/1998 Kuki ................... B60L 11/1805
                                                320/108
2008/0265684 A1* 10/2008 Farkas ................. B60L 11/005
                                                307/104

(Continued)

*Primary Examiner* — Arun C Williams
(74) *Attorney, Agent, or Firm* — Mintz Levin Cohn Ferris Glovsky and Popeo, P.C.; Peter F. Corless

(57) ABSTRACT

A coil alignment method performed in a vehicle-side coil alignment apparatus coupled to a vehicle assembly (VA) controller includes: moving a light-blocking unit protruding from a vehicle parked in a wireless charging area in a first direction toward the ground facing one side of a vehicle-side wireless power transfer pad which is mounted on the vehicle and includes a VA coil, where the light-blocking unit protrudes from the one side of the vehicle-side wireless power transfer pad; stopping movement of the light-blocking unit in response to a first stop signal from a ground assembly (GA) controller; moving the light-blocking unit in a second direction perpendicular to the first direction; and stopping movement of the light-blocking unit in response to a second stop signal from the GA controller.

6 Claims, 12 Drawing Sheets

(56) References Cited

U.S. PATENT DOCUMENTS

| | | | |
|---|---|---|---|
| 2012/0281547 A1* | 11/2012 | Kim | H04B 5/0031 370/242 |
| 2013/0037339 A1* | 2/2013 | Hickox | B60L 11/182 180/167 |
| 2014/0265614 A1* | 9/2014 | Kim | H01F 38/14 307/104 |
| 2016/0355097 A1* | 12/2016 | Konet | B60L 11/182 |
| 2017/0349098 A1* | 12/2017 | Uhm | B60K 28/02 |

* cited by examiner

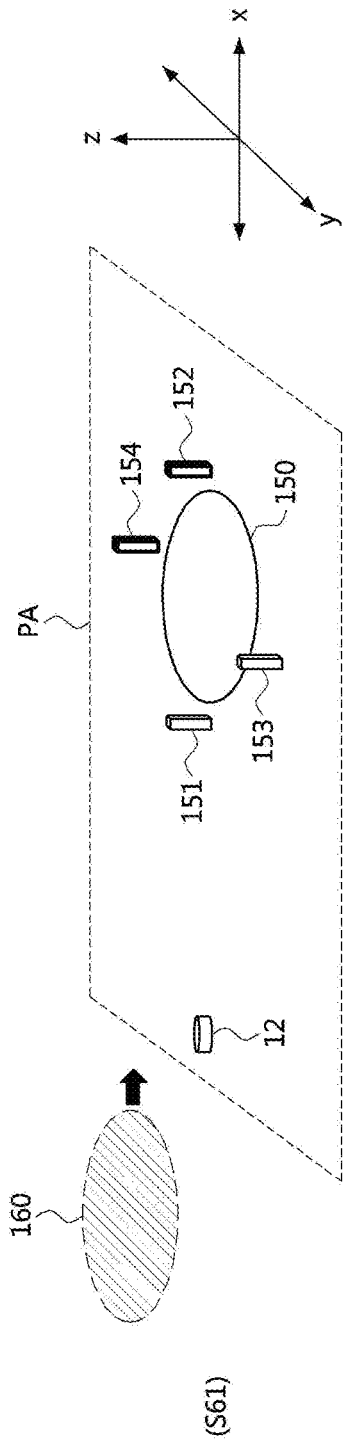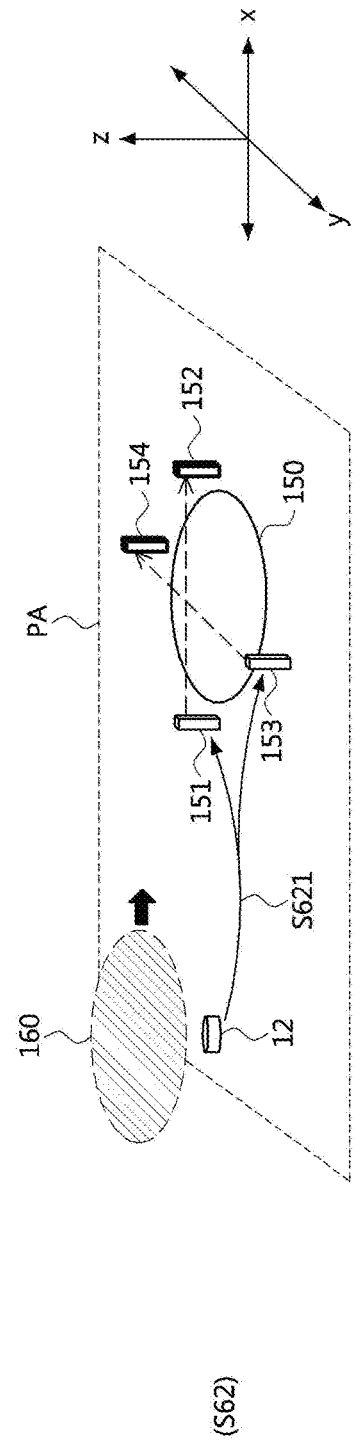

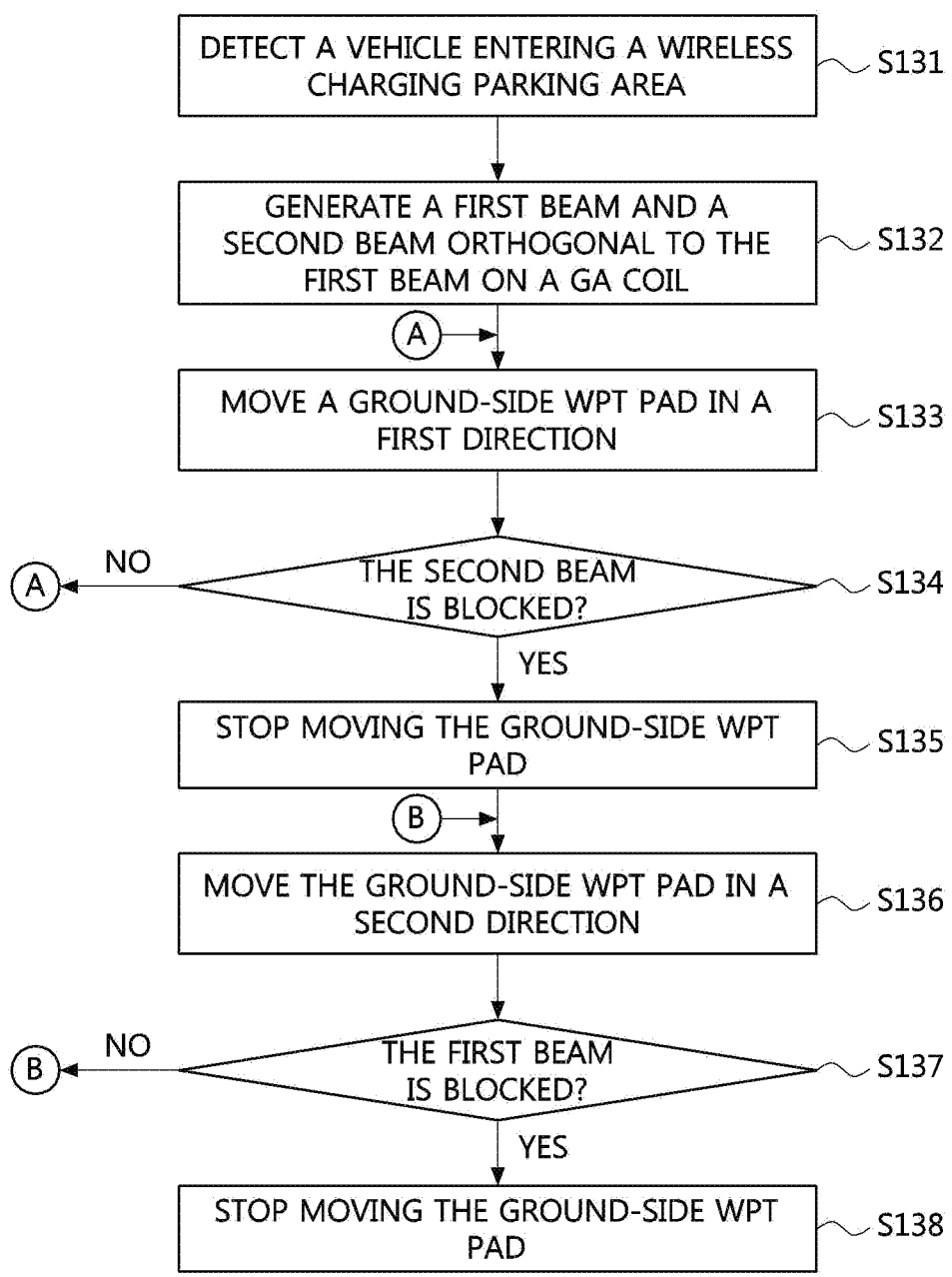

COIL ALIGNMENT METHOD IN WIRELESS POWER TRANSFER SYSTEM AND APPARATUS USING THE SAME

CROSS-REFERENCE TO RELATED APPLICATION

This application claims the benefit of priority to Korean Patent Application No. 10-2016-0075272 filed on Jun. 16, 2016 in the Korean Intellectual Property Office (KIPO), the entire contents of which are hereby incorporated by reference as if fully set forth herein.

TECHNICAL FIELD

The present disclosure relates generally to coil alignment methods, and more particularly, to coil alignment methods and apparatuses using the same in a wireless power transfer system for an electric vehicle.

BACKGROUND

An electric vehicle (EV) is a type of vehicle that is driven by a battery powered motor. As a result, the vehicle has fewer pollution sources, such as exhaust gas and noise, than a conventional gasoline engine vehicle, fewer failures, a longer lifespan, and simple driving operation.

EVs are typically is classified into a hybrid electric vehicle (HEV), a plug-in hybrid electric vehicle (PHEV), and an electric vehicle (EV) according to the driving source. The HEV has an engine as a main power source and a motor as an auxiliary power source. The PHEV has a motor as a main power source and an engine mainly used when a battery is being discharged. The EV, meanwhile, does not have an engine, and has a motor as its sole driving source.

In order to charge a battery equipped in the EV using a wireless charging method, it may be necessary to couple a primary coil of a charging station with a secondary coil of the EV using magnetic resonance. In order to improve efficiency of wireless charging, it may be necessary to align the primary coil with the secondary coil. In a magnetic resonant wireless power transfer system, if the primary coil and the secondary coil are not aligned, the efficiency of wireless power transfer may degrade drastically.

For example, as shown in FIG. 1, when the EV has a secondary coil (referred to as "Rx coil") magnetically coupled to a primary coil (referred to as "Tx coil") installed on the ground, the secondary coil should be aligned with the primary coil. Otherwise, for example, as the distance (a) increases between a first extension line, extended along the central axis of the Tx coil in the form of a circular ring, and the second extension line, extended along the central axis of the Rx coil in the form of a circular ring, the efficiency of power transfer may decrease drastically. Here, as an example, the diameter of the primary and secondary coil may be assumed to be 300 mm and the distance (d) between them may be assumed to be 105 mm As shown in FIG. 2, the efficiency of power transfer (represented with S-parameter S21) in the above-described wireless power transfer system having the primary coil and the secondary coil is drastically reduced from −2.5 dB to −22.5 dB, as the distance (a) between the center axes of the Tx coil and the Rx coil is increased from 0 to 450 mm by 50 mm Meanwhile, one of the conventional alignment methods aligns a vehicle equipped with a secondary coil with a primary coil of a ground assembly using a rear camera of the vehicle. Another conventional alignment method aligns a primary coil in a movable charging pad with a secondary coil of a vehicle by moving the movable charging pad after the vehicle is parked with a speed bump in a parking area.

In the WPT system of the EV, the wireless power transfer is performed between the transmission pad installed in the parking area and the reception pad mounted on the EV. Therefore, the coil alignment of the EV WPT system is difficult as compared to cases of mobile devices and charging pads for them. For this reason, a method of performing coil alignment on the basis of a position showing a maximum magnetic field coupling coefficient above a reference value using an auxiliary coil or the like has been suggested. However, there is still a shortage of effective coil alignment methods applicable to the EV WPT systems. Thus, there is a need for a new coil alignment scheme for the EV WPT systems.

SUMMARY

Accordingly, embodiments of the present disclosure are provided to substantially obviate one or more problems due to limitations and disadvantages of the related art.

Embodiments of the present disclosure provide coil alignment methods for effectively aligning a vehicle assembly coil with a ground assembly coil to achieve superior performance and efficiency in a wireless power transfer system. Embodiments of the present disclosure also provide coil alignment methods using a light-blocking unit and a cross-shaped beam formed by a plurality of beams intersected with each other.

Embodiments of the present disclosure also provide coil alignment methods for a wireless power transfer system for electric vehicles, using a plurality of beams sequentially blocked by a light-blocking unit and apparatuses using the same.

According to embodiments of the present disclosure, a coil alignment method performed in a vehicle-side coil alignment apparatus coupled to a vehicle assembly (VA) controller includes: moving a light-blocking unit protruding from a vehicle parked in a wireless charging area in a first direction toward the ground facing one side of a vehicle-side wireless power transfer pad which is mounted on the vehicle and includes a VA coil, wherein the light-blocking unit protrudes from the one side of the vehicle-side wireless power transfer pad; stopping movement of the light-blocking unit in response to a first stop signal from a ground assembly (GA) controller; moving the light-blocking unit in a second direction perpendicular to the first direction; and stopping movement of the light-blocking unit in response to a second stop signal from the GA controller.

Before the moving of the light-blocking unit in the first direction, a ground-side coil alignment apparatus coupled to the GA controller may adjust a direction of a beam irradiated by a first laser coupled to a GA coil to the first direction.

The light-blocking unit may be moved in the first direction according to a first signal from the GA controller, and the first signal may be generated when the vehicle enters the wireless charging area.

The light-blocking unit may be moved in the second direction according to a second signal from the GA controller, and the second signal may include a signal indicating the second direction as being perpendicular to the right in the first direction or a direction perpendicular to the left in the first direction.

The first stop signal and the second signal may be transmitted simultaneously from the GA controller to the vehicle-side coil alignment apparatus.

The coil alignment method may further include: before moving the light-blocking unit in the first direction, switching the light-blocking unit from an inserted state to a protruded state or from a folded state to an unfolded state.

The light-blocking unit may be movably installed on the vehicle-side wireless power transfer pad, and the vehicle-side wireless power transfer pad may be moved in a three-dimensional space by an actuating shaft or an actuating arm connected to an actuator fixed to the vehicle.

Furthermore, in accordance with embodiments of the present disclosure, a coil alignment method performed in a ground-side coil alignment apparatus coupled to a ground assembly (GA) controller includes: generating a first beam bar extending in a first direction and a second beam bar extending in a second direction perpendicular to the first direction on a GA coil positioned in a wireless charging area using a first light-emitting element, a first light-receiving element, a second light-emitting element, and a second light-receiving element which are each spaced apart from the GA coil by a predetermined distance; moving a ground-side wireless power transfer pad having the GA coil, the first light-receiving element, the second light-emitting element, and the second light-receiving element in the first direction; detecting whether the second beam bar is blocked by a light-blocking unit protruding from a lower part of a vehicle; stopping movement of the ground-side wireless power transfer pad when the second beam bar is blocked; moving the ground-side wireless power transfer pad in the second direction; detecting whether the first beam bar is blocked by the light-blocking unit; and stopping movement of the ground-side wireless power transfer pad when the first beam bar is blocked.

The coil alignment method may further include, before the moving of the ground-side wireless power transfer pad in the first direction: estimating a parking direction to which a front of the vehicle is directed or an orientation of a vehicle-side wireless power transfer pad provided at the lower part of the vehicle based on image processing of an image of an upper part or the lower part of the vehicle, and adjusting a longitudinal direction or an extended direction of the first beam bar.

The coil alignment method may further include, before the generating of the first beam bar and the second beam bar, detecting the vehicle entering the wireless charging area. A vehicle entry detection signal, which is generated when the vehicle is detected, may trigger the generation of the first beam bar.

The light-blocking unit may be installed at a center or a predetermined position of one side of the vehicle-side wireless power transfer pad.

Furthermore, in accordance with embodiments of the present disclosure, a coil alignment method performed in a ground-side coil alignment apparatus coupled to a ground assembly (GA) controller includes: emitting a first beam in a first direction by controlling a first light-emitting element spaced apart from a GA coil positioned in a wireless charging area by a predetermined distance; emitting a second beam in a second direction perpendicular to the first direction by controlling a second light-emitting element spaced apart from the GA coil by a predetermined distance; transmitting a first stop signal to a vehicle assembly (VA) controller of a vehicle parked in the wireless charging area when the first beam is not detected in a first light-receiving element installed to sense the first beam; and transmitting a second stop signal to the VA controller when the second beam is not detected in a second light-receiving element installed to sense the second beam.

The coil alignment method may further include, before the emitting of the first beam, adjusting an irradiation direction of the first light-emitting element to the first direction based on an image of the parked vehicle or parking state information of the parked vehicle.

The coil alignment method may further include, before the emitting of the first beam, rotating a ground-side wireless power transfer pad having the first light-emitting element, the first light-receiving element, the second light-emitting element, the second light-receiving element, and the GA coil by an angle calculated based on an image of the parked vehicle or parking state information of the parked vehicle so that a direction of the first beam is adjusted to the first direction.

Furthermore, in accordance with embodiments of the present disclosure, a coil alignment apparatus coupled to a wireless power transfer apparatus for a vehicle includes: an actuator control unit receiving a signal from a ground assembly (GA) controller coupled to a GA coil installed in a wireless charging area where the vehicle enters and outputting a control signal based on the received signal; and an actuator moving a light-blocking unit protruding from the vehicle toward the ground or a vehicle-side wireless power transfer pad to which the light-blocking unit is physically coupled. The actuator control unit controls the actuator to move the light-blocking unit in a first direction, to stop movement of the light-blocking unit in response to a first stop signal from the GA controller, to move the light-blocking unit in a second direction perpendicular to the first direction, and to stop movement of the light-blocking unit in response to a second stop signal from the GA controller.

The coil alignment apparatus may further include: a camera outputting an image including a first beam bar, a second beam bar perpendicular to the first beam bar on a ground-side wireless power transfer pad having the GA coil, and the light-blocking unit; and an image processing unit processing the image to obtain the first direction based on an angle of a cross-shaped beam formed by the first beam bar and the second beam bar and based on a relative position of the camera before the actuator control unit moves the light-blocking unit in the first direction.

The actuator control unit may receive, from the GA controller, the first stop signal and a second signal indicating the second direction as being perpendicular to the right in the first direction or a direction perpendicular to the left in the first direction simultaneously.

Furthermore, in accordance with embodiments of the present disclosure, a coil alignment apparatus coupled to a ground-side wireless power transfer apparatus includes: a cross-shaped beam generation unit generating a first beam bar extending in a first direction and a second beam bar extending in a second direction perpendicular to the first direction on a ground assembly (GA) coil positioned in a wireless charging area using a first light-emitting element, a first light-receiving element, a second light-emitting element, and a second light-receiving element which are each spaced apart from the GA coil by a predetermined distance; a beam-blocking detection unit detecting whether the second beam bar is blocked by a light-blocking unit protruding from a lower part of a vehicle parked in the wireless charging area; and a pad movement unit moving a ground-side wireless power transfer pad having the GA coil, the first light-emitting element, the first light-receiving element, the second light-emitting element, and the second light-receiving element in the first direction, moving the ground-side wireless power transfer pad in the second direction according to a first output of the beam-blocking detection unit, and stopping movement of the ground-side wireless power transfer pad according to a second output of the beam-blocking detection unit.

The coil alignment apparatus may further includes: a camera positioned at a predetermined relative position with respect to the first light-emitting element or a center of the ground-side wireless power transfer pad and taking an image of the light-blocking unit; and a beam direction correction unit connected to an image processing apparatus for processing the image from the camera and obtaining a relative position or direction from the first light-emitting element or the center of the ground-side wireless power transfer pad to the light-blocking unit.

The beam direction correction unit may output a signal or information for rotating the ground-side wireless power transfer pad.

BRIEF DESCRIPTION OF DRAWINGS

Embodiments of the present disclosure will become more apparent by describing in detail embodiments of the present disclosure with reference to the accompanying drawings, in which:

FIGS. 6 to 10 are conceptual diagrams explaining an operation principle of the coil alignment method of FIG. 4;

FIG. 13 is a second flowchart explaining a coil alignment method of a wireless power transfer system according to embodiments of the present disclosure;

Figure 1:
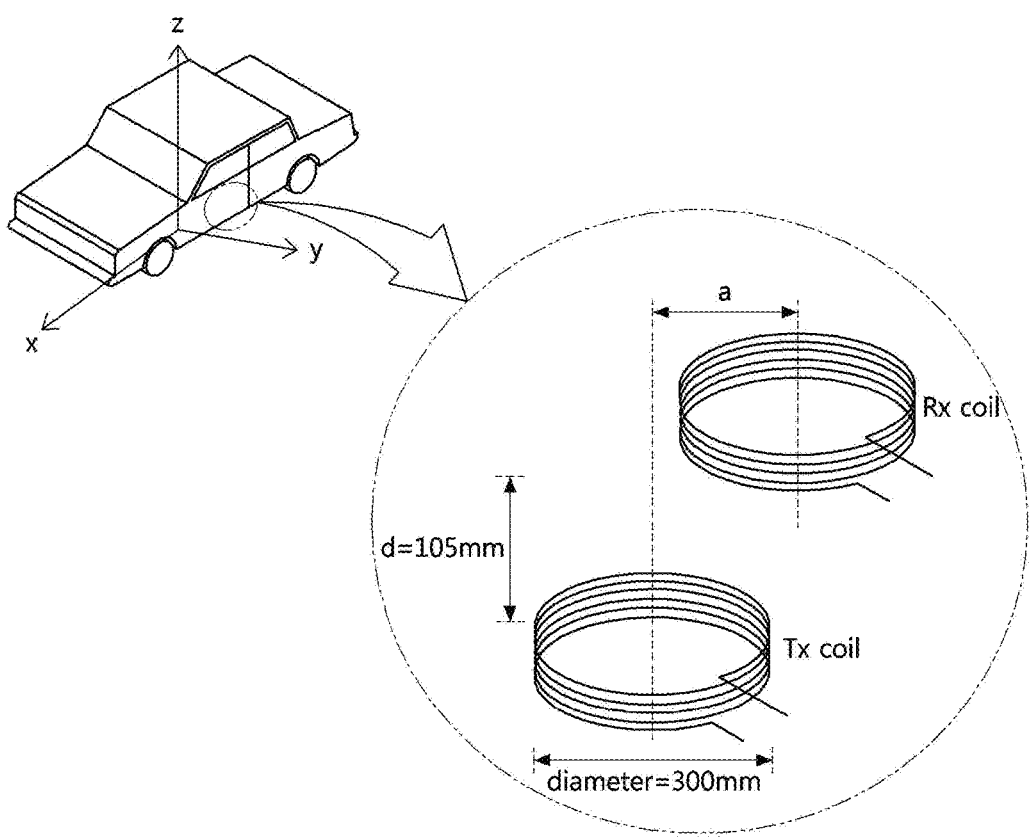
FIG. 1 is a diagram explaining alignment between wireless power transfer coils in a conventional EV.
Figure 2:
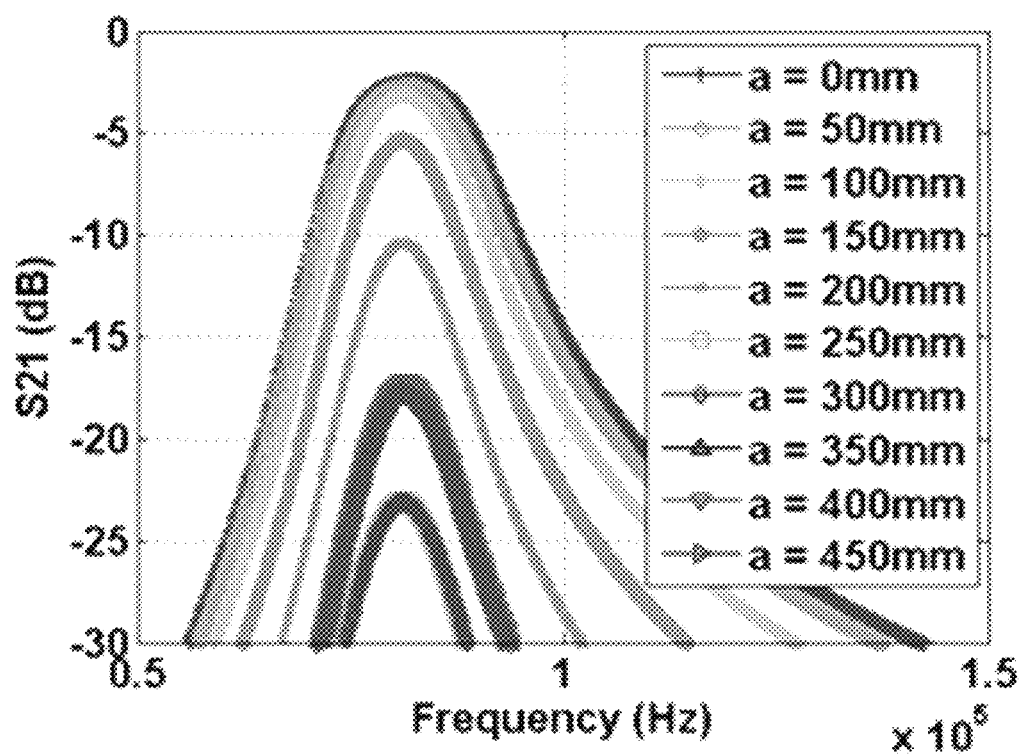
FIG. 2 is a graph illustrating change of wireless power transfer efficiency according to errors of alignment shown in FIG. 1.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment

DETAILED DESCRIPTION OF THE EMBODIMENTS

Embodiments of the present disclosure are disclosed herein. However, specific structural and functional details disclosed herein are merely representative for purposes of describing embodiments of the present disclosure. Embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

"Electric Vehicle, EV": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle, PEV": An Electric Vehicle that recharges the on-vehicle primary battery by connecting to the power grid.

"Plug-in vehicle, PV": An electric vehicle rechargeable through wireless charging from an electric vehicle supply equipment (EVSE) without using a physical plug or a physical socket.

"Heavy duty vehicle; H.D. Vehicle": Any four-or more wheeled vehicle as defined in 49 CFR 523.6 or 49 CFR 37.3 (e.g., bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system, WCS": The system for wireless power transfer and control between the GA and VA including alignment and communications. This system transfers energy from the electric supply network to the electric vehicle electromagnetically through a two-part loosely coupled transformer.

"Wireless power transfer, WPT": The transfer of electrical power from the AC supply network to the electric vehicle by contactless means.

"Utility": A set of systems which supply electrical energy and include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and/or rights.

"Interoperability": A state in which component of a system interwork with corresponding components of the system in order to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In the present disclosure, the inductive charging system may correspond to an EV power transfer system.

"Inductive coupler": The transformer formed by the coil in the GA coil and the coil in the VA coil that allows power to be transferred with galvanic isolation.

"Inductive coupling": Magnetic coupling between two coils. In the present disclosure, coupling between the GA coil and the VA coil.

"Ground assembly, GA": An assembly on the infrastructure side consisting of the GA coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly, VA": An assembly on the vehicle consisting of the VA coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA coil to the plane of the lower of the bottom of the litz wire or the magnetic material in the VA coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may refer to positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

"Command and control communication": The communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning ad pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which you want to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is installed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

In embodiments according to the present disclosure, the light load driving or light load operation may include, for example, charging the high voltage battery with a charging voltage lower than a predetermined rated voltage in the latter half of charging for the high voltage battery connected to the VA in the WPT system. Also, the light load operation may include a case in which the high-voltage battery of EV is charged at a relatively low voltage and at a low speed by using a low-speed charger such as a household charger.

Hereinafter, embodiments according to the present disclosure will be explained in detail by referring to accompanying figures.

Figure 3:
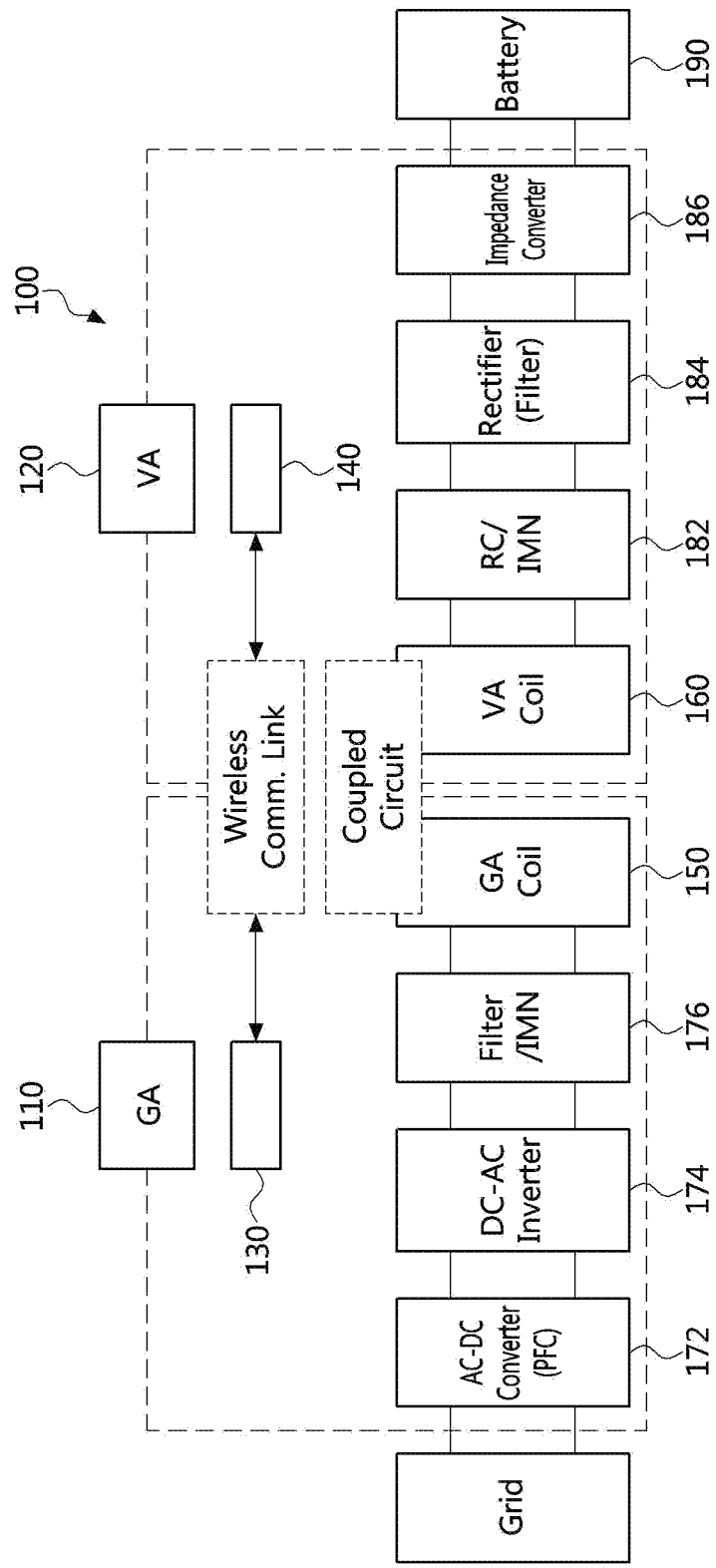
FIG. 3 is a block diagram illustrating a wireless power transfer system using an alignment method for wireless power transfer coils according to embodiments of the present disclosure.

FIG. 3 is a block diagram illustrating a wireless power transfer system using an alignment method for wireless power transfer coils according to embodiments of the present disclosure.

As shown in FIG. 3, a wireless power transfer system 100 according to embodiments of the present disclosure may comprise a ground assembly (GA) 110 and a vehicle assembly (VA) 120.

The GA 110 may include an alternating current to direct current (AC-DC) converter 172 having a power factor correction (PFC) function connected to a grid, a direct current to alternating current (DC-AC) inverter 174, a filter/impedance matching network (IMN) 176, and a GA coil (referred to also as "primary coil") 150. Also, the GA 110 may further include a GA controller 130.

The VA 120 may include a VA coil (referred to also as "secondary coil") 160 forming a magnetic coupled circuit with the GA coil 150, a resonant circuit (RC)/IMN 182, a rectifier/filter 184, and an impedance converter 186. The impedance converter 186 may be coupled to the vehicle's high voltage battery 190. Also, the VA 120 may further include a VA controller 140.

The GA controller 130 and the VA controller 140 may be connected to each other via a wireless communication link. For example, the GA controller 130, the VA controller 140, or a combination thereof may include a coil alignment apparatus which will be described later or perform a function corresponding to the coil alignment apparatus. Also, the GA controller 130 and/or the VA controller 140 may be implemented as a computing device that has a memory and a processor such as a microprocessor or an electronic control unit, and is capable of processing digital signals.

Figure 4:
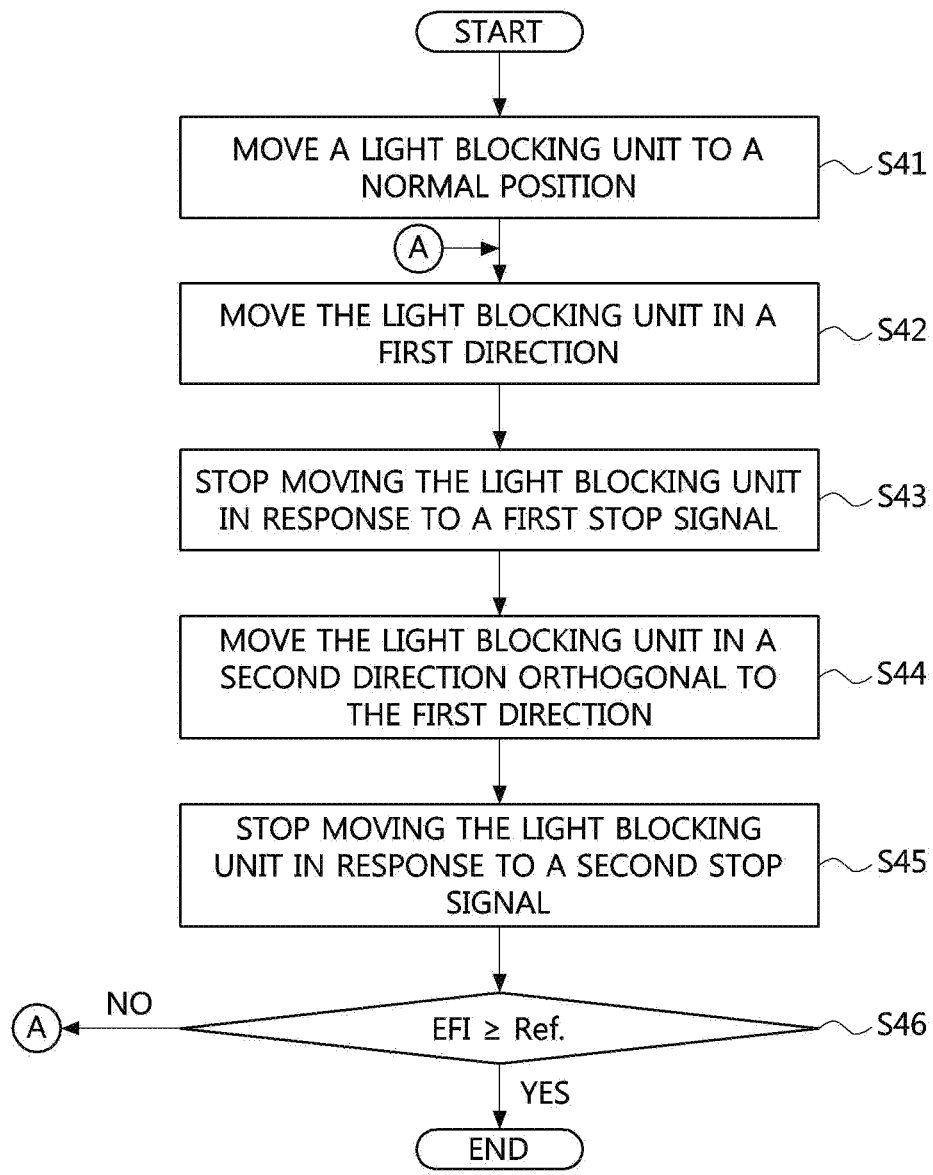
FIG. 4 is a first flow chart explaining a coil alignment method according to embodiments of the present disclosure.

FIG. 4 is a first flow chart explaining a coil alignment method according to embodiments of the present disclosure.

As shown in FIG. 4, a coil alignment method according to an embodiment may be performed in a coil alignment apparatus coupled to the VA controller (hereinafter, referred to as a "vehicle-side coil alignment apparatus"). The VA controller is basically an apparatus for controlling a VA in an EV wireless power transfer (WPT) system and is capable of communicating with a GA controller of the WPT system via a communication unit. The coil alignment apparatus may be coupled to the VA controller and may be implemented to perform a coil alignment function as at least partially mounted in the VA controller, depending on the implementation. In addition, the coil alignment method may be performed in a computing device that has a processor and a memory, such as a microprocessor or an electronic control unit, corresponding to the GA or VA controller, and can process digital signals.

More specifically, the coil alignment apparatus according to an embodiment may move a light-blocking unit protruding from a vehicle parked in a wireless charging parking area in the first direction (S42). Here, the light-blocking unit may be installed to protrude from one surface of a vehicle-side wireless power transfer pad mounted on the vehicle and incorporating a VA coil toward a ground facing one surface.

Also, the movement of the light-blocking unit in the first direction may be controlled by operating an actuator included in the coil alignment apparatus in response to a predetermined trigger signal when the predetermined trigger signal is input to the coil alignment apparatus. The actuator may be coupled to the light-blocking unit or to a vehicle-side WPT pad having the light-blocking unit. The vehicle-side WPT pad may be referred to as a receiving pad or a secondary pad, but is not limited thereto, and may be referred to as a transmitting/receiving pad when considering a bidirectional wireless power transfer.

Then, the coil alignment apparatus may stop the movement of the light-blocking unit in response to a first stop signal for stopping the movement in the first direction from the GA controller (S43). The first stop signal may be generated by the GA controller or a beam-blocking detection unit connected to the GA controller, when a second beam bar extending in a second direction perpendicular to the first direction in a cross-shaped beam on the GA coil is blocked by the movement of the light-blocking unit in the first direction.

Then, the coil alignment apparatus may move the light-blocking unit in the second direction perpendicular to the first direction (S44). The movement of the light-blocking unit in the second direction may be automatically performed after stopping the movement in the first direction in accordance with the reception of the first stop signal. Of course, the coil alignment apparatus may be configured to receive the first stop signal together with a second signal for instructing the movement in the second direction, or receive both of the first stop signal and the second signal simultaneously from the GA controller or a ground-side coil alignment apparatus connected to the GA controller.

Then, the coil alignment apparatus may stop the movement of the light-blocking unit in response to a second stop signal for stopping the movement in the second direction from the GA controller (S45). The second stop signal may be generated by the GA controller or the beam-blocking detection unit connected to the GA controller, when a first beam bar extending in the first direction in the cross-shaped beam on the GA coil is blocked by the movement of the light-blocking unit in the second direction.

Then, according to the implementation, the coil alignment apparatus may confirm whether a magnetic field intensity (MFI) induced in the VA coil is greater than or equal to a reference intensity through interworking or data transmission/reception with the VA controller (S46). When a coupling coefficient based on a current intensity corresponding to the magnetic field intensity or the magnetic field intensity in the aligned coils is smaller than the reference intensity or a reference value, the coil alignment apparatus may return to the step S42, and repeatedly perform the above steps S42 to S45.

Meanwhile, the coil alignment apparatus according to embodiments of the present disclosure may move the light-blocking unit to a predetermined normal position before the step S41. The light-blocking unit may be in an inserted state (e.g., non-protruding state) or in a folded state when not used for wireless charging. Thus, the predetermined normal position may mean a state in which the light-blocking unit is protruded or unfolded to be used for wireless charging. This state switching will be described in detail later.

Figure 5:
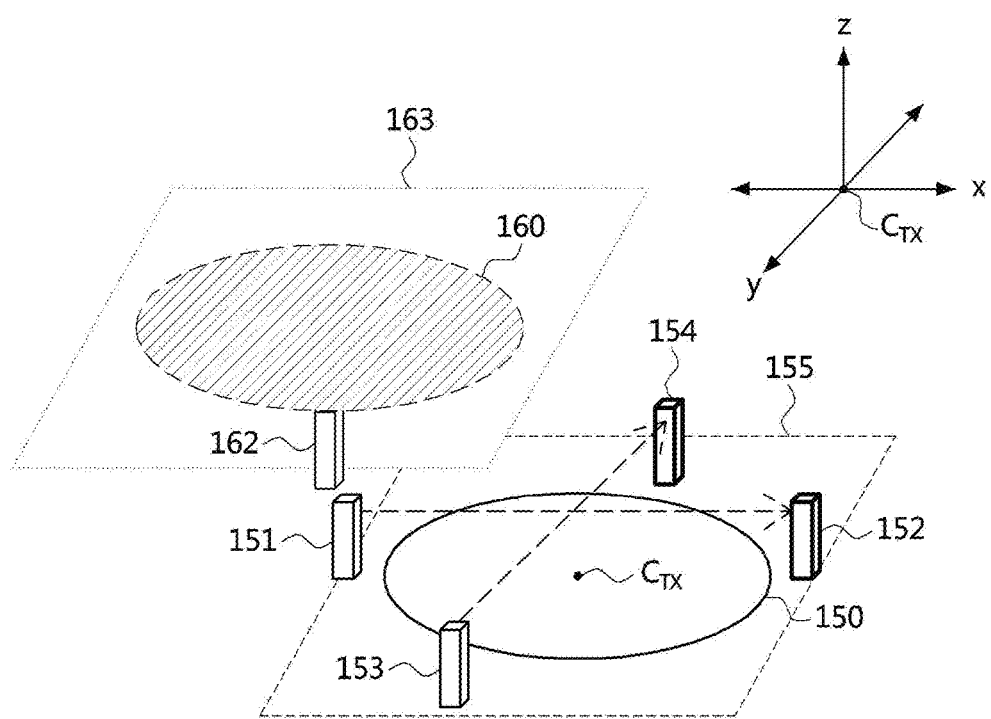
FIG. 5 is a conceptual diagram explaining the coil alignment method of FIG. 4.

FIG. 5 is a conceptual diagram explaining the coil alignment method of FIG. 4.

As shown in FIG. 5, the coil alignment apparatus performing the coil alignment method according to embodiments of the present disclosure may be implemented with at least one of the vehicle-side coil alignment apparatus coupled to the VA controller and the ground-side coil alignment apparatus coupled to the GA controller.

The vehicle-side coil alignment apparatus may comprise a light-blocking unit 162, and the light-blocking unit 162 may be disposed near a VA coil 160. The light-blocking unit 162 may be coupled to a vehicle-side WPT pad (hereinafter, simply referred to as a 'secondary pad') 163 having the VA coil 160. The light-blocking unit 162 may be disposed on a center of the physical structure of the VA coil 160 (e.g., center of gravity) or on a symmetrical center point or symmetry center axis according to a specific magnetic field intensity and shape.

The secondary pad 163 may include the VA coil 160, a ferrite, an outer case, and the like.

In FIG. 5, the VA coil 160 is shown as a hatched circle. However, such the illustration is used only for the sake of convenience in distinguishing from a ground-side WPT pad 155 (hereinafter, simply referred to as a "primary pad"), and the VA coil 160 may be an inductive coupler between the power transmitting side and the power receiving side of the WPT system or between the power supply side and the power demand side of the WPT system. The VA coil may be fabricated using a variety of topologies such as a conventional circular, a square non-polarized, a solenoid polarized, a DD polarized (double D polarized), a multi-coil DD quadrature (DDQ), a multi-coil bipolar, and the like. The secondary pad 163 may include the VA coil 160, a magnetic body, and a supporting member or an outer case for supporting them. The secondary pad 163 may include the light-blocking unit 162 coupled to the support member or the outer case. Here, the "polarity" may refer to a characteristic in which the shape of the flux is determined or changed according to the direction of the pad.

The ground-side coil alignment apparatus may include a first light-emitting element 151, a first light-receiving element 152, a second light-emitting element 153 and a second light-receiving element 154 that are coupled to the primary pad 155. The first light-emitting element 151, the first light-receiving element 152, the second light-emitting element 153, and the second light-receiving element 154 may be disposed around a GA coil 150.

The primary pad 155 may include the GA coil 150, a ferrite, an outer case and the like. The first light-emitting element 151, first light-receiving element 152, second light-emitting element 153, and light-receiving element 154 may be fixedly arranged in the outer case. The primary pad 155 may include a first wiring connected to the GA coil 150, a second wiring connected to the first and second light-emitting elements 151 and 153, and a third wiring connected to the first and second light-receiving elements 152 and 154.

The first light-emitting element 151 may output a light (hereinafter, referred to as a "beam"), and the first light element device 152 may receive or detect the beam output from the first light-emitting element 151. With this configuration, the first light-emitting element 151 and the first light-receiving element 152 may generate a first beam bar therebetween. The first beam bar may be formed to extend across the GA coil 150 or over a magnetic surface of the GA coil 150.

The second light-emitting element 153 may also output a beam and the second light-receiving element 154 may receive or detect the beam output from the second light-emitting element 153. With this configuration, the second light-emitting element 152 and the second light-receiving element 154 may generate a second beam bar therebetween. The second beam bar may be perpendicular to the first beam bar and may be formed to extend across the GA coil 150 or over the magnetic surface of the GA coil 150. Accordingly, the second beam bar and the first beam bar may form a cross-shaped beam on the GA coil 150, in which the two beam bars are intersected with each other. It is preferable that the intersection point of the two beam bars is located on the center portion or the center point CTX of the GA coil 150 according to the position of the light-blocking unit 162 on the VA coil 160.

Figure 15:
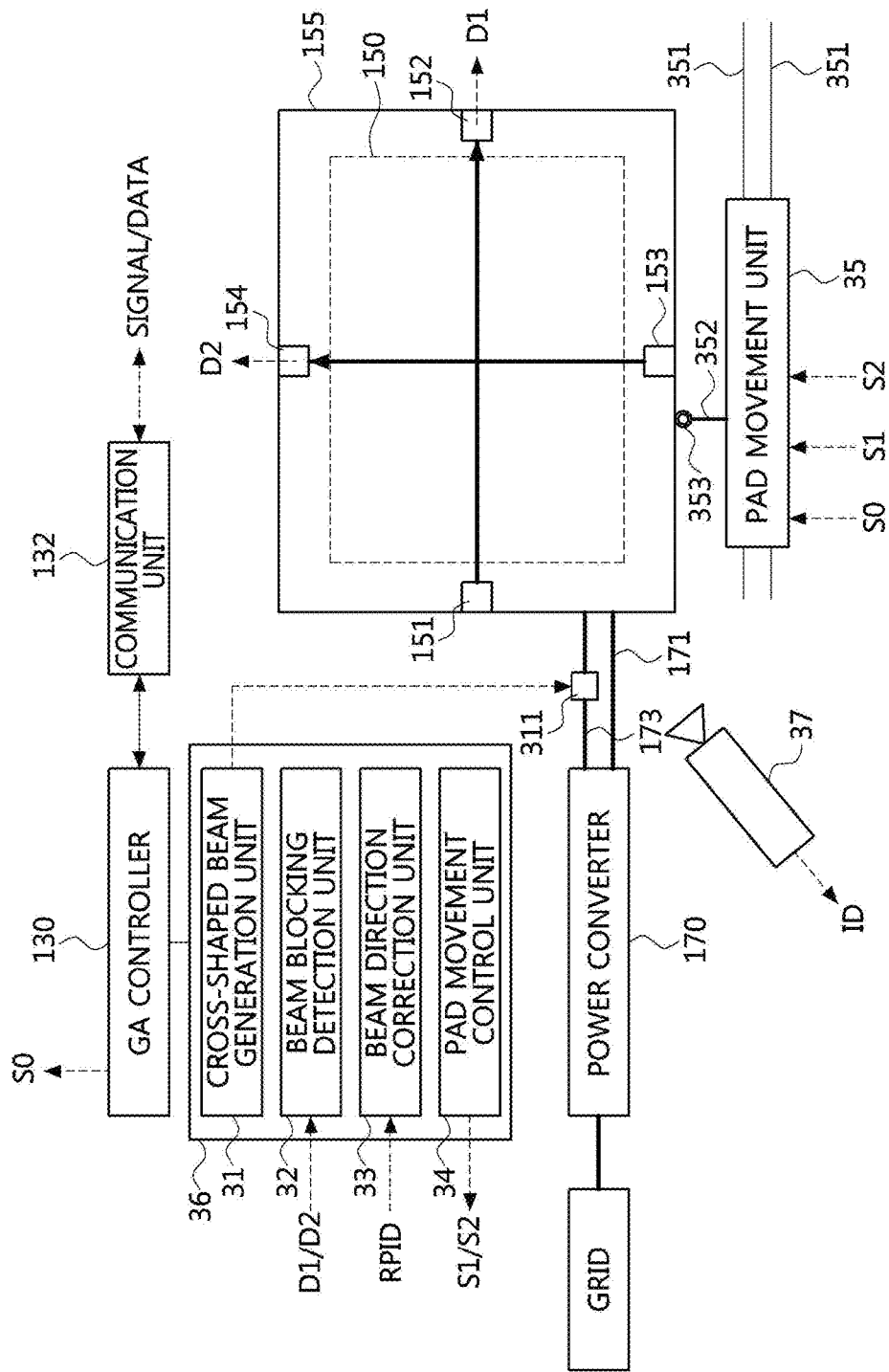
FIG. 15 is a block diagram illustrating a coil alignment apparatus using the coil alignment method of FIG. 14.

The first light-emitting element 151 and the second light-emitting element 153 may be turned on or off by a switching control of the ground-side coil alignment apparatus or a cross shaped beam generation unit (e.g., see 311 in FIG. 15). The first light-emitting element 151 and the second light-emitting element 153 may be a light amplification by stimulated emission of radiation (LASER) element, a similar means for generating a straight beam, or the like.

The first light-receiving element 152 and the second light-receiving element 154 may transmit a signal or information on whether or not the corresponding beam is received to the ground-side coil alignment apparatus or the beam-blocking detection unit. The first light-receiving element 152 and the second light-receiving element 154 described above may be a laser monitoring sensor, a photoelectric element, a means capable of sensing a light or beam, or a component that performs a function corresponding to the same.

It may be preferable that the above-described beam has basically a visible wavelength. However, embodiments of the present disclosure are not limited thereto, and the beam may have a wavelength of infrared or ultraviolet band which is invisible.

Meanwhile, in the above-described example, the light-blocking unit 162 is described as being disposed at the center of the VA coil 160, but embodiments of the present disclosure are not limited to such a configuration. Additionally, when the light-blocking unit 162 is disposed at one side edge of the VA coil 160, a cross-shaped beam intersection point may also be disposed at one side edge of the GA coil 150 corresponding to the position of the light-blocking unit 162. In this case, the final position at which the light-blocking unit 162 blocks both of the first beam bar and the second beam bar may also correspond to the one side edge.

FIGS. 6 to 10 are conceptual diagrams explaining an operation principle of the coil alignment method of FIG. 4.

Referring first to FIG. 6, a sensor 12 for detecting a vehicle having the VA coil 160 may be installed in a wireless charging area, such as a wireless charging parking area (PA). That is, the sensor 12 may wait to detect the vehicle entering the wireless charging parking area (S61). The sensor 12 may be referred to as a vehicle entry detection sensor and may be installed on a floor, a ceiling, a ceiling side structure, or the like of the parking area. The sensor 12 may be implemented using an infrared sensor, an ultrasonic sensor, a gravity sensor, a contact sensor, an optical sensor, or the like.

Also, the parking area may have the GA coil 150, and two light-emitting elements 151 and 153 and two light-receiving elements 152 and 154 which are arranged around the GA coil 150. That is, the first light-emitting element 151 and the first light-receiving element 152 may be arranged to generate the first beam bar extending over the GA coil 150 in the first direction, and the second light-emitting element 153 and the second light-receiving element 154 may be arranged to generate the second beam bar extending across the GA coil 150 in the second direction. The first direction and the second direction may be directions perpendicular to each other, and the first beam bar and the second beam bar may be intersected directly with each other, or intersected with each other as spaced apart from each other. In the three-dimensional Cartesian coordinate system, the first direction may correspond to the x-direction and the second direction to the y-direction.

Then, referring to FIG. 7, when the sensor 12 detects the vehicle entering the parking area, a vehicle entry detection signal (hereinafter referred to as a "first signal") may be transmitted from the sensor 12 to the ground-side coil alignment apparatus or the GA controller connected to the ground-side coil alignment apparatus (S62). The first and second light-emitting elements 151 and 153 may start light-emitting operations in response to the first signal. That is, in response to the first signal, the first and second light-emitting elements 151 and 153 may generate beams perpendicular to each other, and the first and second light-receiving elements 152 and 154 may detect the respective beams.

Also, depending on the implementation, the movement of the light-blocking unit 162 in the first direction may be started by the VA controller or the ground-side coil alignment apparatus connected to the VA controller in response to the first signal from the ground-side coil alignment apparatus or the GA controller coupled to the ground-side coil alignment apparatus.

Figure 8:
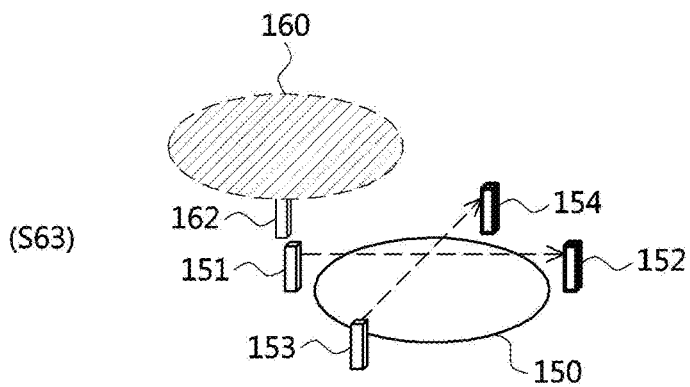

Then, referring next to FIG. 8, the light-blocking unit 162 may move in the first direction (e.g., the positive x-direction) (S63). The movement of the light-blocking unit 162 may be replaced by a relative movement of the primary pad in the direction opposite to the first direction (e.g., the negative x-direction). Here, the movement of the light-blocking unit 162 may be performed by moving the secondary pad provided with the light-blocking unit 162 through a conveying means or actuator coupled to the vehicle. The movement of the primary pad may be performed by a conveying means or actuator coupled to the primary pad.

Figure 9:
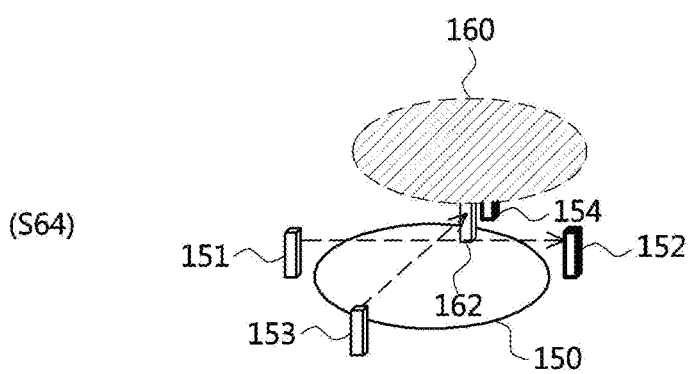

Then, referring next to FIG. 9, the second beam bar extending in the second direction may be blocked by moving the light-blocking unit 162 in the first direction (S64). The blocking of the second beam bar may refer to a case where the second beam does not reach or is not detected by the second light-receiving element 154. When the second beam bar is blocked, the ground-side coil alignment apparatus or the GA controller connected thereto may transmit a first stop signal to the vehicle-side coil alignment apparatus connected to the VA controller or the VA controller. The first stop signal is for stopping the movement of the light-blocking unit 162 in the first direction.

Also, the vehicle-side coil alignment apparatus may move the light-blocking unit 162 in the second direction perpendicular to the first direction after stopping the movement of the light-blocking unit 162 in the first direction.

Depending on the implementation, the movement of the light-blocking unit 162 in the second direction may be performed in response to a second signal from the GA controller. The second signal may include a signal indicating a direction (hereinafter, referred to as a "2R direction") perpendicular to the right in the first direction or a signal indicating a direction (hereinafter, referred to as a "2L direction") perpendicular to the left in the first direction. In this case, the first stop signal and the second signal may be transmitted together or simultaneously from the GA controller to the VA controller or the vehicle-side coil alignment apparatus.

Also, the vehicle-side coil alignment apparatus may select the second direction among the 2R direction and the 2L direction, and the selection may be performed together with determination or correction of the first direction and stored in advance. For example, a first distance and/or area between the vehicle parked in the parking area and a right line of the parking area may be compared with a second distance and/or area between the vehicle parked in the parking area and a left line of the parking area to determine a direction having the larger distance and/or area to be the second direction.

Also, when the difference between the first distance and/or area and the second distance and/or area is within an error range, the vehicle-side coil alignment apparatus may be configured to move the light-blocking unit 162 first by a predetermined distance in the 2R direction, and then move the light-blocking unit 162 by a predetermined distance in the 2L direction when the blocking of the first beam bar is not sensed.

Figure 10:
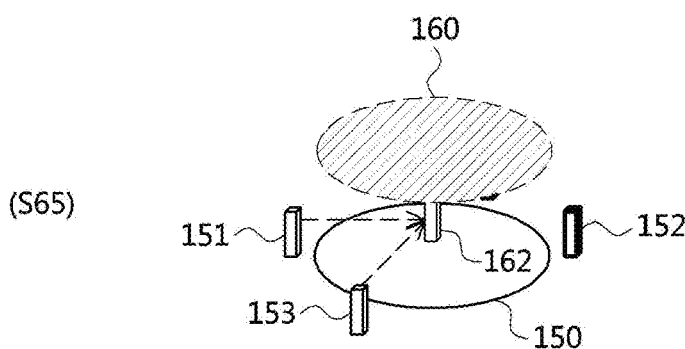

Then, referring next to FIG. 10, the first beam bar extending in the first direction may be blocked by the movement of the light-blocking unit 162 in the second direction (S65). The blocking of the first beam bar may refer to a case where the first beam does not reach the first light-receiving element 152 or is not detected. When the first beam bar and the second beam bar are blocked at the same time, the ground-side coil alignment apparatus or the GA controller connected thereto may transmit a second stop signal to the VA controller or the vehicle-side coil alignment apparatus connected to the VA controller. The second stop signal may be for stopping the movement of the light-blocking unit 162 in the second direction.

According to the above-described example, it may be possible to effectively align the GA coil 150 with the VA coil 160 at a position where the first beam bar and the second beam bar are blocked at the same time. Alternatively, when the light-blocking unit 162 is moved in the first direction, the first direction may be determined or corrected. For example, although the first direction is basically set to the frontal direction (i.e., the positive x-direction) of the front-parked vehicle, the coil alignment apparatus may correct the first direction according to a parking state of the vehicle. Here, the parking state of the vehicle may include an angle (i.e., parking angle) between the vehicle parked in the parking area and a side parking line of the vehicle. In the above-described case, the coil alignment apparatus may be configured to rotate an arrangement angle of the secondary pad in the opposite direction by the parking angle, based on the frontal direction of the front-parked vehicle.

Also, according to the implementation, the ground-side coil alignment apparatus connected to the GA controller may be provided with a signal or information about the parking angle from the VA controller, and rotate the primary pad by the parking angle with respect to the frontal direction of the vehicle according to the signal or information. In this case, it may be possible to control the beam irradiation direction of a first laser which is coupled to the GA coil as a single body through the outer case so that the first laser irradiates the first beam in the corrected first direction.

On the other hand, in the above-described example, a single beam is basically generated between the first light-emitting element and the first light-receiving element 152. However, embodiments of the present disclosure are not limited to such a structure, and a plurality of beams may be generated between the first light-emitting element and the first light-receiving element 152. In this case, when viewed from the vehicle-side toward the ground, the plurality of beams may be spaced apart from each other by a predetermined distance in the horizontal direction, spaced apart from each other by a predetermined distance in the vertical direction, or spaced apart from each other by a predetermined distance in the horizontal and vertical directions between the first light-emitting element and the first light-receiving element 152. In this case, a cross section of the beam bar may be a structure in which cross sections of the plurality of beams exist, not a single cross section of a single beam. Also, in the above-described case, the light-blocking unit may block at least one of the beams extending in the first direction, and terminate the coil alignment at a position where at least one of the beams extending in the second direction is blocked.

Meanwhile, in the above-described example, the light-receiving element is used for effectively detecting beam-blocking, but the present disclosure is not limited to such a configuration. At least one of the first and second light-receiving elements of the present embodiment may be replaced with a means or component capable of sensing that the beam of the first and second light-emitting elements is blocked. For example, a sensor may be capable of sensing a beam through its heat, color, or the like without directly sensing the beam passing through a region where the first light-receiving element or the second light-receiving element is located, in order to detect the blocking of the first beam bar or the second beam bar.

Figure 11:
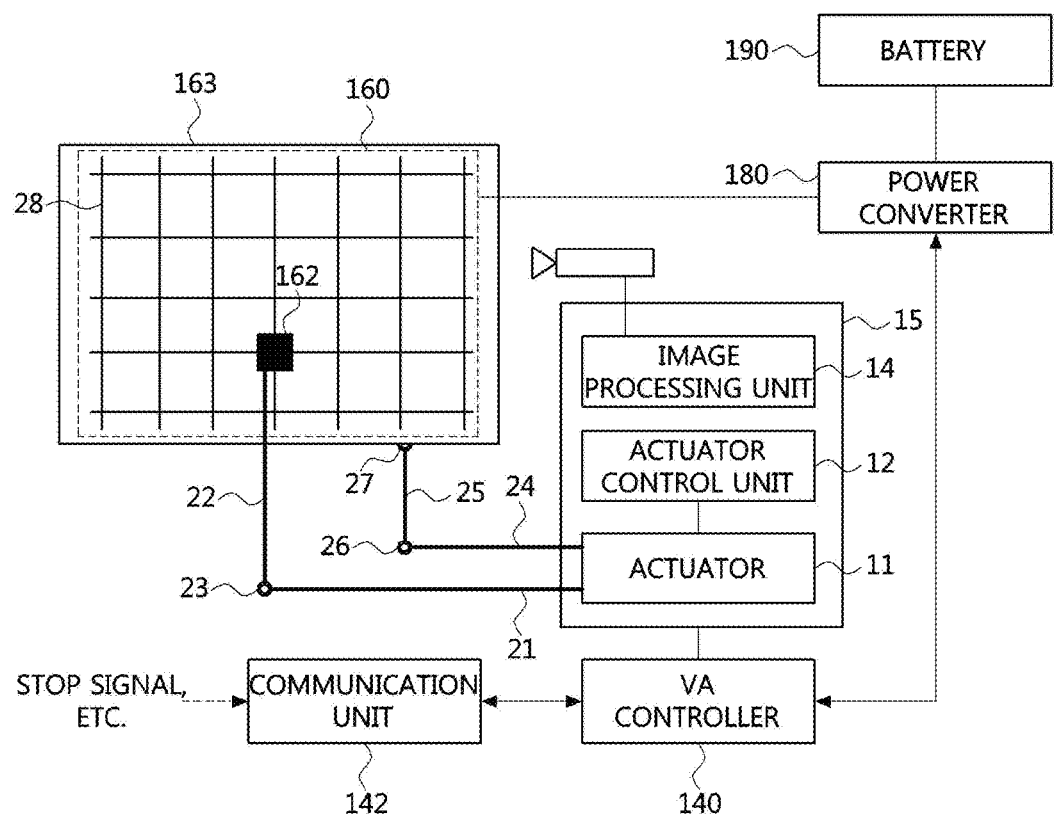
FIG. 11 is a block diagram explaining the coil alignment apparatus using the coil alignment method of FIG. 4.

FIG. 11 is a block diagram explaining the coil alignment apparatus using the coil alignment method of FIG. 4.

The coil alignment apparatus using the coil alignment method according to embodiments of the present disclosure may be implemented as the vehicle-side coil alignment apparatus, the ground-side coil alignment apparatus, or a combination of them. Here, the vehicle-side coil alignment apparatus will be mainly described.

As shown in FIG. 11, the coil alignment apparatus may be coupled to the VA or the VA controller 140 of the VA. The VA may include the VA controller 140, the VA coil 160, and the power converter 180. The VA controller 140 may be connected to the GA controller through the communication unit 142 to receive the stop signals or the like. The VA coil 160 may be provided on the secondary pad 163 and the light-blocking unit 162 may be disposed on the secondary pad 163. Also, the power converter 180 may comprise a resonant circuit/IMN (e.g., see 182 in FIG. 3), a rectifier/filter, and an impedance converter, and may be connected to the battery 190.

The coil alignment apparatus according to the embodiments of the present disclosure may have means and/or components for actively moving the light-blocking unit 162.

For example, the coil alignment apparatus may include an actuator 11 and an actuator control unit 12. The actuator 11 may move the light-blocking unit protruding from the vehicle toward the ground, or a vehicle-side wireless power transfer pad (i.e., the secondary pad) to which the light-blocking unit is physically connected. The actuator may include a device that operates using an energy source such as electricity, compressed air, and hydraulic pressure according to a signal output from the actuator control unit 12, and may be installed to perform linear motion or rotational motion. The actuator 12 may be provided with actuating arms 21, 22, 23 and 24, and actuating shafts 23, 26 and 27 for the linear and/or rotational motion. Further, the actuating arm may be provided so that its length can be expanded or contracted similarly to an operation manner of a foldable antenna pole.

According to the configuration of the actuator 11, the light-blocking unit 162 may move on the secondary pad 163 by the actuating arms 21 and 22 and the actuating shaft 23 along a rail 28 or a guiding uneven part having on the secondary pad 163. Also, the secondary pad 163 may move on a two-dimensional plane or in a three-dimensional space by the actuating arms 24 and 25 and the actuating shafts 26 and 27. Here, the actuating shaft may be referred to as a rotary shaft or a joint part, and the actuating shaft 27 may be replaced with a hinge according to an implementation.

The actuator control unit 12 may identify the signal from the GA controller coupled to the GA coil installed in the wireless charging parking area where the vehicle enters, control the actuator 11 by outputting a control signal based on information in the identified signal. The actuator control unit 12 may receive the second signal indicating the 2L direction or the 2R direction as the second direction together with or simultaneously with the first stop signal from the GA controller.

That is, the actuator control unit 12 may control the actuator 11 to move the light-blocking unit 162 protruding from the vehicle in the first direction, stop the movement of the light-blocking unit 162 in response to the first stop signal from the GA controller, move the light-blocking unit 162 in the second direction perpendicular to the first direction, and stop the movement of the light-blocking unit 162 in response to the second stop signal from the GA controller.

The actuator control unit 12 may include a plurality of switching elements and may be configured to operate at least a part of the plurality of actuating arms in the actuator 11 according to an input signal. The actuator control unit 12 may selectively move the light-blocking unit 162 and/or the secondary pad 163 connected to the actuator 11 on a two-dimensional plane or in a three-dimensional space.

Also, the coil alignment apparatus according to embodiments of the present disclosure may include a camera 13 and an image processing unit 14. The camera 13 may take an image of a cross-shaped beam generated on the GA coil. The camera 13 may also output an image in which the first beam bar on the primary pad having the GA coil, the second beam bar perpendicular to the first beam bar, and the light-blocking unit are taken together.

The image processing unit 14 may read the image from the camera 13 and estimate or determine a relation between the cross-shaped beam and the first direction in which the light-blocking unit 162 is to move. Also, the image processing unit 14 may process the image from the camera 13 to determine the first direction based on a tilt of the cross-shaped beam in the image and a relative position of the camera 13. Since such image processing techniques which can be used for this purpose are already well known, detailed description thereof will be omitted.

Some of the components (e.g., 11, 12 and 14) of the above-described coil alignment apparatus may be accommodated in the housing 15, and attached to the lower side of the vehicle.

According to the coil alignment apparatus of the present embodiment, the cross-shaped beam generated at a predetermined position in relation to the GA coil may be blocked by moving the light-blocking unit sequentially in the first direction and the second direction, so that the VA coil can be effectively aligned with the GA coil. Here, the first direction may be determined or corrected based on the image from the camera. However, the determination or correction of the first direction is not limited to such a configuration.

Figure 12A:
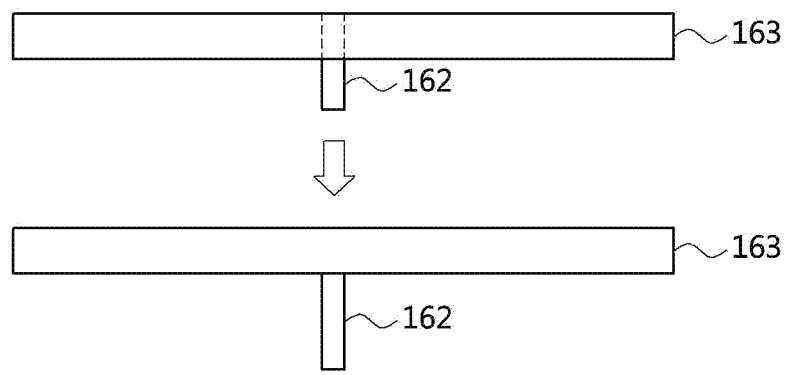
FIGS. 12A and 12B are diagrams illustrating a structure of a light-blocking unit used in the coil alignment apparatus of FIG. 11.
Figure 12B:
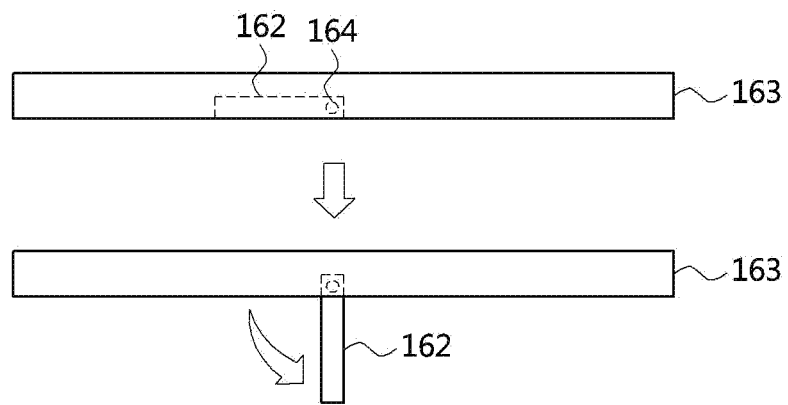

FIGS. 12A and 12B are diagrams illustrating a structure of a light-blocking unit used in the coil alignment apparatus of FIG. 11.

Referring first to FIG. 12A, the light-blocking unit 162 of the coil alignment apparatus according to embodiments of the present disclosure may be coupled to the secondary pad 163 mounted on the vehicle as inserted at least partly into the secondary pad 163, and configured to protrude from the vehicle by a predetermined length or more when the vehicle enters the wireless charging parking area.

For example, as shown in FIG. 12A, the light-blocking unit 162 may be normally partially inserted in the central portion of the secondary pad 163, and arranged to protrude by a predetermined length by the actuator, when the vehicle enters the wireless charging parking area or a predetermined signal is transferred to the actuator coupled to the light-blocking unit 162.

As another example, as shown in FIG. 12B, the light-blocking unit 162 may be folded in a state in which the entire portion of the light-blocking unit 162 is hidden at the center of the secondary pad 163, and may be configured to be unfolded by a predetermined length by being rotated by the actuator, when the vehicle enters the wireless charging parking area or a predetermined signal is transferred to the actuator coupled to the light-blocking unit 162.

According to such the configuration of the light-blocking unit, in the coil alignment method, the light-blocking unit may be implemented to move in the first direction after the light-blocking unit is switched from the inserted state to the protruding state or from the folded state to the unfolded state when the vehicle enters the wireless charging parking area.

FIG. 13 is a second flowchart explaining a coil alignment method of a wireless power transfer system according to embodiments of the present disclosure.

As shown in FIG. 13, the coil alignment method according to embodiments of the present disclosure may be performed by a coil alignment apparatus coupled to the GA controller. The coil alignment apparatus may be implemented as a separate device from the GA controller, or at least some of its functional or configuration parts may be included in the GA controller.

The coil alignment apparatus may detect a vehicle entering the wireless charging parking area (S131). The detection may be implemented as a vehicle entry detection signal transmitted from an infrared sensor disposed in the wireless charge parking are and the vehicle entry detection signal may be used to trigger generation of the first beam bar.

Then, the coil alignment apparatus may generate the first beam bar extending in the first direction and the second beam bar extending in the second direction perpendicular to the first direction on the GA coil, by using the first light-emitting element, the first light-receiving element, the second light-emitting element, and the second light-receiving element which are disposed at respective positions spaced apart from the GA coil by a predetermined distance (S132).

Then, the coil alignment apparatus may move the ground-side wireless power transfer pad (i.e., primary pad) having the GA coil, the first light-emitting element, the first light-receiving element, the second light-emitting element and the second light-receiving element in the first direction (S133).

On the other hand, before the primary pad is moved in the first direction, the coil alignment apparatus may adjust the direction of the first beam bar to be the first direction by estimating a parking direction in which the front of the vehicle is directed or an arrangement direction of the primary pad installed in the lower part of the vehicle based on image processing on the upper part or the lower part of the vehicle.

Then, the coil alignment apparatus may sense or determine whether the second beam bar extending in the second direction perpendicular to the first direction is blocked by the light-blocking unit protruding from the lower part of the vehicle (S134). If it is determined that the second beam bar is not blocked, the coil alignment apparatus may determine whether the second beam bar is periodically blocked during the movement of the primary pad in the first direction.

If it is determined that the second beam bar is blocked, the coil alignment apparatus may stop moving the ground-side WPT pad (S135). On the other hand, if it is detected that the second beam bar has not been blocked after the movement of the primary pad is stopped, the coil alignment apparatus may move the light-blocking unit at a speed slower than the previous speed in a direction opposite to the first direction by 180 degrees, and stop moving the light-blocking unit when the second beam bar is blocked.

Then, the coil alignment apparatus may move the ground-side WPT pad in the second direction while the light block unit is blocking the second beam bar (S136). The second direction may be a right or left direction perpendicular to the first direction, predetermined according to a parking state of the vehicle or a comparison of distances or areas between the vehicle and side lines of the parking area, and the corresponding signal or message may be provided to the coil alignment apparatus.

Then, the coil alignment apparatus may detect whether the first beam bar is blocked by the light-blocking unit (S137). If the first beam bar is not blocked, the coil alignment apparatus may periodically or repeatedly determine whether the first beam bar is blocked (S137).

Then, when the first beam bar is blocked, that is, when the second beam bar is blocked together with the first beam bar, the coil alignment apparatus may stop the movement of the ground-side WPT pad (S138).

Figure 14:
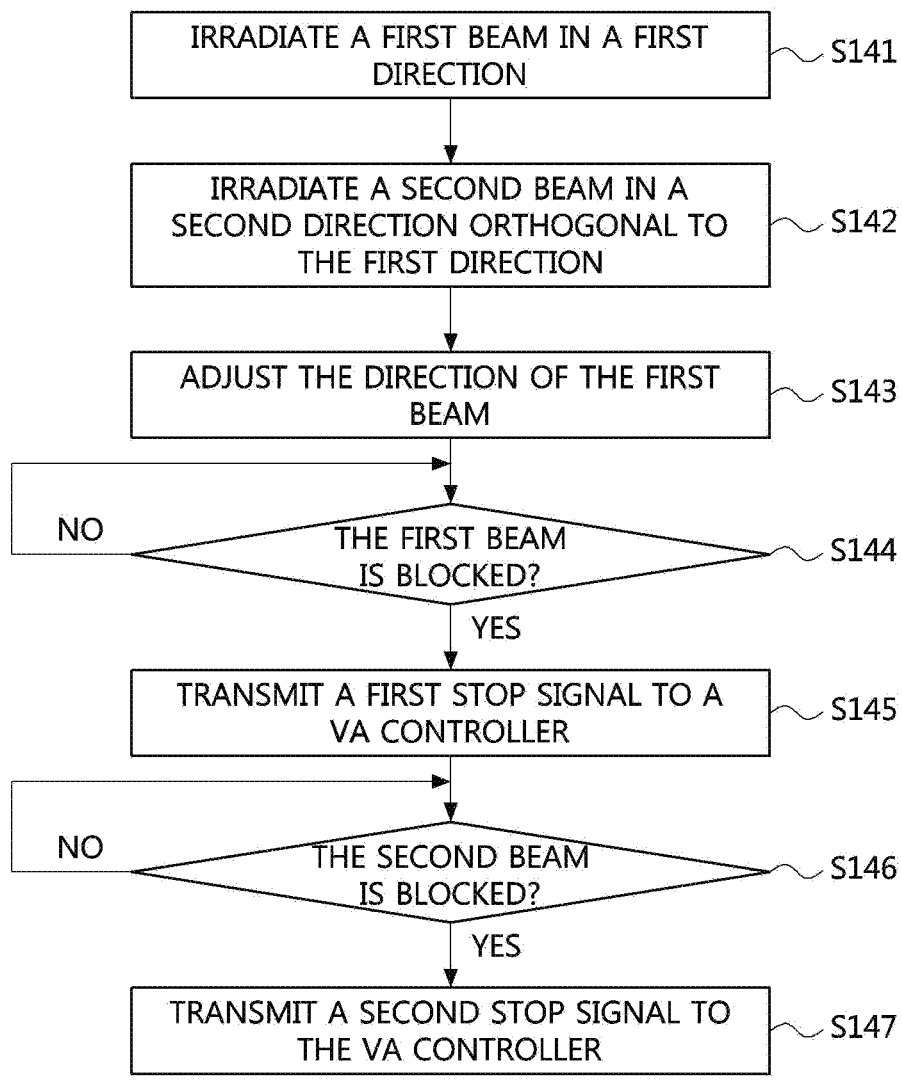
FIG. 14 is a third flowchart explaining a coil alignment method of a wireless power transfer system according to embodiments of the present disclosure.

FIG. 14 is a third flowchart explaining a coil alignment method of a wireless power transfer system according to embodiments of the present disclosure.

As shown in FIG. 14, the coil alignment method according to embodiments of the present disclosure may be performed by a coil alignment apparatus coupled to the GA controller.

The coil alignment apparatus may control the first light-emitting element, which is spaced apart from the GA coil located in the wireless charging parking are, to irradiate the first beam in the first direction (S141).

Then, the coil alignment apparatus may control the second light-emitting element, which is spaced a part from the GA coil, to irradiate the second beam in the second direction perpendicular to the first direction (S142).

Meanwhile, before or after at least one of the steps S141 and S142, the coil alignment apparatus may adjust the irradiation direction of the first beam or the irradiation direction of the first light-emitting element for irradiating the first beam (S143).

For example, in order to adjust the irradiation direction of the first beam, the coil alignment apparatus may be configured to adjust the irradiation direction of the first beam to the first direction, based on image processing on an image of the parked vehicle or the parking state of the vehicle in the wireless charging parking area.

Also, according to embodiments of the present disclosure, the coil alignment apparatus may rotate the primary pad including the light-emitting elements and light-receiving elements so that the irradiation direction of the first light-emitting element is adjusted to the first direction by an angle calculated based on a result of processing the image of the parked vehicle or the parking state of the vehicle in the wireless charging parking area.

Then, the coil alignment apparatus may transmit the first stop signal to the VA controller of the vehicle in the wireless charge parking area when the first beam is not detected in the first light-receiving element installed to sense the first beam (S144 and S145).

Then, the coil alignment apparatus may transmit the second stop signal to the VA controller when the second beam is not detected in the second light-receiving element provided to detect the second beam (S146 and S147).

According to the present example, it may be possible to effectively align the GA coil with the VA coil by moving the ground-side WPT pad so that the light-blocking unit of the vehicle blocks either the horizontal beam or the vertical beam on the GA coil first and then blocks both of the beams.

FIG. 15 is a block diagram illustrating a coil alignment apparatus using the coil alignment method of FIG. 14.

As shown in FIG. 15, a coil alignment apparatus using the coil alignment method according to embodiments of the present disclosure may comprise the GA controller 130, the GA coil 150, and the power converter 170. The GA controller 130 may be connected to the VA controller via the communication unit 132 to transmit and/or receive signals and/or data such as the stop signals. The GA coil 150 may be provided in the primary pad 155 and the first light-emitting element 151, the first light-receiving element 152, the second light-emitting element 153, and the second light-receiving element 154 may be disposed in the primary pad 155. Also, the power converter 170 may comprise the AC-DC converter (e.g., see 172 in FIG. 3) having a PFC function, the DC-AC inverter, the filter/IMN, and the like, and may be connected to a grid including a commercial power supply or the like.

Also, the coil alignment apparatus may comprise means and/or components for actively moving the primary pad 155, generating a cross-shaped beam on the primary pad 155, and sensing the blocking of the cross-shaped beam.

That is, the coil alignment apparatus may include a cross shaped beam generation unit 31, a beam-blocking detection unit 32, a beam direction correction unit 33, a pad movement control unit 34, and a pad movement unit 35. Also, depending on the implementation, the coil alignment apparatus may further comprise a camera 37, and be connected to an external image processing unit that processes images from the camera 37.

The cross-shaped beam generation unit 31 may use the first light-emitting element 151, the first light-receiving element 152, the second light-emitting element 153, and the second light-receiving element 154, which are coupled to the GA coil 150 as spaced apart from the GA coil 150 located in the parking area by predetermined distances, to generate the first beam bar extending in the first direction on the GA coil and the second beam bar extending in second direction perpendicular to the first direction. In order to control operations of the first and second light-emitting elements 151 and 153, the cross-shaped beam generation unit 31 may control operations of a switch 311 disposed on a wiring 173 for connecting the power converter 170 and the first and second light-emitting elements 151 and 153. Also, the power converter 170 may supply electrical power to the GA coil 150 through another wiring 171.

The beam-blocking detection unit 32 may detect whether the second beam bar is blocked by the light-blocking unit protruding from the lower part of the vehicle in the wireless charging parking area, and monitor whether the first beam bar is blocked. The beam-blocking detection unit 32 may receive detection signals D1 and D2 from the first and second light-receiving elements 152 and 154 to determine whether each of the beam bars is blocked or not. The beam-blocking detection unit 32 may be implemented with a signal level comparator coupled to an analog-to-digital converter (ADC) and the ADC.

The beam direction correction unit 33 may correct the beam direction or the beam irradiation direction based on the parking state of the vehicle or the image for the parked vehicle. For example, the beam direction correction unit 33 may be connected to the image processing apparatus (which may include an image processing apparatus installed in the vehicle) that reads the image from the camera 37, thereby obtaining a relative position or direction from the center of the first light-emitting element 151 or the ground-side WPT pad 155 (i.e., the primary pad) to the light-blocking unit. Also, the beam direction correction unit 33 may output a signal or information for rotating the ground-side WPT pad 155 to the pad movement control unit 34 or the GA controller 130.

The pad movement control unit 34 may output signals S1 and S2 for controlling the pad movement unit 35 in response to an input signal for correcting the beam direction or an input signal for moving the primary pad 155. Also, the pad movement unit 35 may move the primary pad 155 in the first direction according to a vehicle entry detection signal, move the primary pad 155 in the second direction according to a first output of the beam-blocking detection unit 32 and a first control signal S1 generated by the pad movement control unit 34 based on the first output, and stop moving the primary pad 155 according to a second output of the beam-blocking detection unit 32 and a second control signal S2 generated by the pad movement control unit 34 based on the second output.

Also, before or after the cross-shaped beam is generated, the pad movement unit 35 may rotate the primary pad 155 based on a beam direction correction signal SO from the pad movement control unit 34 or the GA controller 130 in order to adjust or align the direction of a beam constituting the cross-shaped beam. For this, the pad movement unit 35 may comprise an actuating arm 352 and a rotary part 353 for rotatably coupling the actuating arm 352 and the secondary pad 155. Also, the pad movement unit 35 may further include a rail 351 extending in one direction on which the primary pad 155 is moved.

The camera 37 may be positioned at a predetermined relative position from the first light-emitting element 151 or the center of the primary pad 155. Further, the light-blocking unit mounted on the vehicle in the wirelessly charging parking area may be photographed at a predetermined camera angle. The image data photographed by the camera 37 may be transmitted to the image processing apparatus mounted on the vehicle, and results obtained by processing the image data may be transmitted to the beam direction correction unit 33.

On the other hand, in the above-described example, the first direction is estimated or determined in advance by processing the image from the camera when the light-blocking unit starts moving in the first direction with respect to the GA coil or when the GA coil starts moving in the first direction with respect to the light-blocking unit. However, embodiments of the present disclosure are not limited to such a configuration and may be implemented using a means for detecting arrangements between the vehicle, the VA, or the secondary pad and the primary pad or the GA. In this case, the means for detecting arrangements may use a laser scanner instead of the camera in the ground-side coil alignment apparatus, so that the laser scanner scans the lower part of the vehicle at a predetermined angle and identifies an identifier (e.g., a tag) fixed in the lower part of the vehicle to obtain a first correction value for the first direction. Here, the identifier (e.g., tag) may include a three-dimensional projection structure or a three-dimensional projection arrangement having a predetermined shape.

While the embodiments of the present disclosure and their advantages have been described in detail, it should be understood that various changes, substitutions and alterations may be made herein without departing from the scope of the disclosure.

What is claimed is:

1. A coil alignment method performed in a vehicle-side coil alignment apparatus coupled to a vehicle assembly (VA) controller, the coil alignment method comprising:
    moving a light-blocking unit protruding from a vehicle parked in a wireless charging area in a first direction toward the ground facing one side of a vehicle-side wireless power transfer pad which is mounted on the vehicle and includes a VA coil, wherein the light-blocking unit protrudes from the one side of the vehicle-side wireless power transfer pad;
    stopping movement of the light-blocking unit in response to a first stop signal from a ground assembly (GA) controller;
    moving the light-blocking unit in a second direction perpendicular to the first direction; and
    stopping movement of the light-blocking unit in response to a second stop signal from the GA controller,
    wherein, before the moving of the light-blocking unit in the first direction, a ground-side coil alignment apparatus coupled to the GA controller adjusts a direction of a beam irradiated by a first laser coupled to a GA coil to the first direction.

2. The coil alignment method according to claim 1, wherein the light-blocking unit is moved in the first direction according to a first signal from the GA controller, and the first signal is generated when the vehicle enters the wireless charging area.

3. The coil alignment method according to claim 1, wherein the light-blocking unit is moved in the second direction according to a second signal from the GA controller, and the second signal includes a signal indicating the second direction as being perpendicular to the right in the first direction or a direction perpendicular to the left in the first direction.

4. The coil alignment method according to claim 3, wherein the first stop signal and the second signal are transmitted simultaneously from the GA controller to the vehicle-side coil alignment apparatus.

5. The coil alignment method according to claim 1, further comprising:
    before moving the light-blocking unit in the first direction, switching the light-blocking unit from an inserted state to a protruded state or from a folded state to an unfolded state.

6. The coil alignment method according to claim 1, wherein the light-blocking unit is movably installed on the vehicle-side wireless power transfer pad, and the vehicle-side wireless power transfer pad is moved in a three-dimensional space by an actuating shaft or an actuating arm connected to an actuator fixed to the vehicle.

* * * * *